(No Model.)
W. COOLEY.
Manufacture of Cheese.
No. 238,091. Patented Feb. 22, 1881.
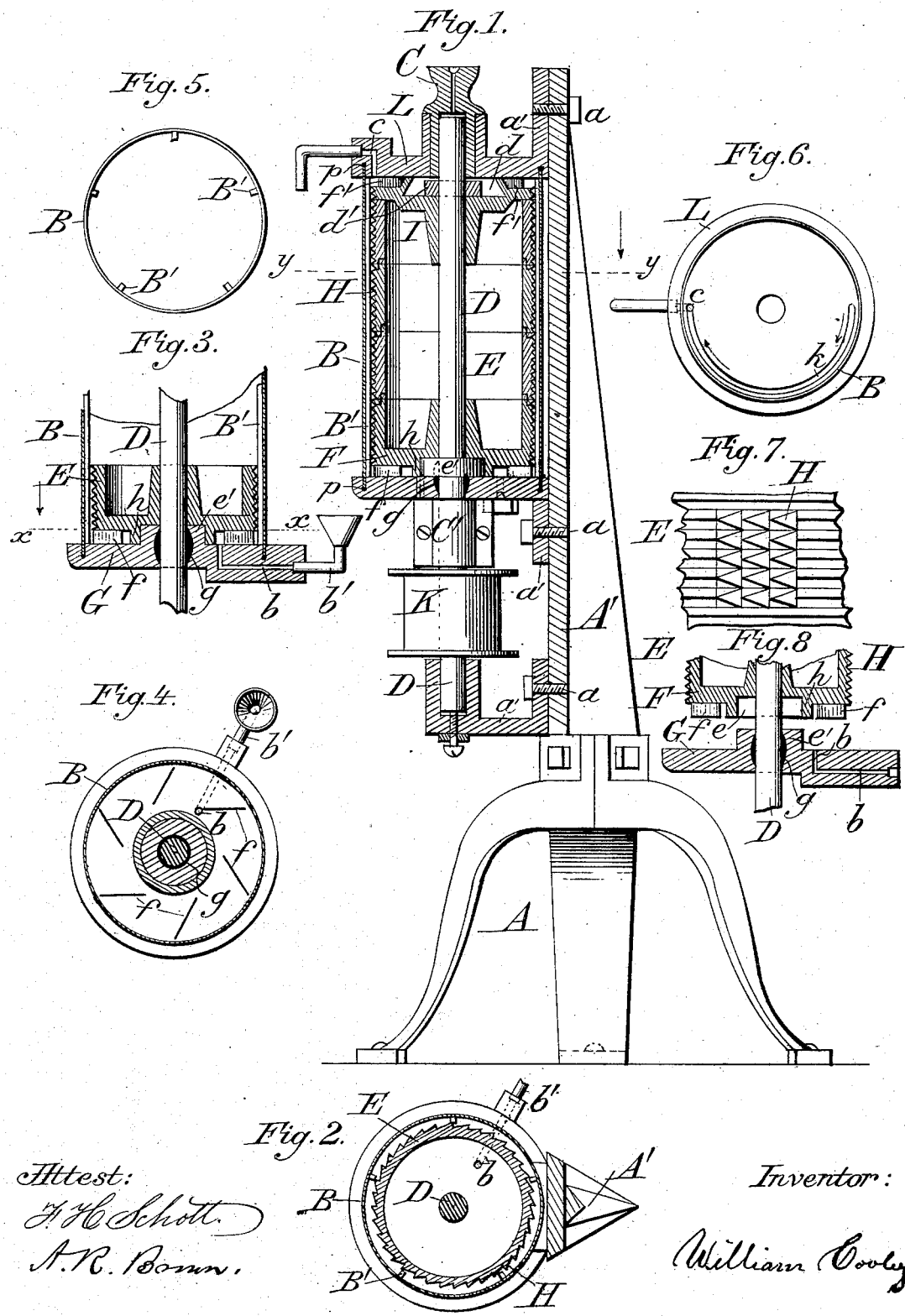

UNITED STATES PATENT OFFICE.

WILLIAM COOLEY, OF WATERBURY, VERMONT.

MANUFACTURE OF CHEESE.

SPECIFICATION forming part of Letters Patent No. 238,091, dated February 22, 1881.

Application filed October 11, 1880. (No model.)

*To all whom it may concern:*

Be it known that I, WILLIAM COOLEY, a citizen of the United States, residing at Waterbury, in the county of Washington and State of Vermont, have invented certain new and useful Improvements in the Manufacture of Cheese; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to machinery for the manufacture of lard-cheese from skimmed milk; and it consists in the employment of a revolving toothed cylinder arranged within an outer inclosing shell or receptacle, said cylinder being provided with devices whereby the melted lard and a part of the skimmed milk of which the cheese is composed are made to pass rapidly upward through the receptacle while the lard is being thoroughly disintegrated and mixed with the milk, the mixture being continually discharged through an outlet-pipe at the upper part of the machine, whence it is removed to a cheese-vat and mixed with skimmed milk, as hereinafter more fully described.

In the annexed drawings, Figure 1 represents a vertical elevation of the machine, partly in section. Fig. 2 is a horizontal section on the line $x\ x$ of Fig. 3, which is a sectional view of the lower part of the cylinder and shell. Fig. 4 is an inner plan view of the bottom of the shell, cylinder, and pump. Fig. 5 is a horizontal section of the outer shell. Fig. 6 is an inverted plan view of the top of the shell. Fig. 7 is a view of the outer surface of the revolving toothed cylinder, and Fig. 8 is a detail.

The machine is supported on a suitable standard, A, which in the drawings is represented as provided with an upright brace or stand, A', to which the machine is secured by suitable bolts $a\ a$, passing through the brackets $a'\ a'$.

The outer shell or receptacle, B, which is cylindrical in form, is secured to the stand A' in a vertical position, and is provided on its inner vertical surface with several longitudinal ribs, B', extending from end to end. It is also provided at its lower end with an inlet-tube, $b$, which is formed in the body of the lower head, G, as shown in Figs. 3 and 8, and provided with a funnel attachment, $b'$, a similar outlet-tube, $c$, being formed in the upper head, L. The upper and lower ends of the shell or the heads G L are made with grooves, in which the side of the shell fits, a suitable packing, $p$, being interposed, in order to insure a tight joint. They are also centrally perforated, and are provided with bushes or boxes C C', which form bearings for the shaft D, to which the revolving toothed cylinder E is secured. This cylinder E is preferably composed of hollow sections, and is made to fit within the outer shell, B, so as to barely clear the longitudinal ribs B', and thus confine the mixture of lard and milk between said ribs in as small a space as possible and prevent its revolution with the cylinder.

The lower end, F, of the cylinder E is provided on its outer surface with a circular recess, $e$, which receives a corresponding projection, $e'$, on the inner side of the lower head, G, of the shell B, which is centrally perforated through the projection $e'$ for the passage of the shaft D, and this perforation is chambered to receive a suitable packing, $g$, which surrounds the shaft D for the purpose of securing an air-tight joint to assist in the working of the pump. This pump is composed of the lower cylinder-head, F, and the projecting wings or blades $f$ attached thereto, which are arranged tangentially, as shown in Fig. 4. As the cylinder revolves the action of the blades $f$ is to throw or force the mixture of milk and melted lard, which is introduced through the opening $b$, into the space between the cylinder and shell, whence it passes upward and is confined by the ribs B' for the action of the teeth H on the outer side of the revolving cylinder.

In the lower head, F, of the cylinder, surrounding the recess $e$, is an annular flange, $h$, between which and the wings $f$ a space is left for the passage of the mixture. As the recess $e$ extends above the space on the outer side of the flange $h$ all danger of leakage is obviated, and the tendency of the mixture to pass from said space through the joint in the head is effectually prevented.

The upper end, I, of the cylinder is also provided on its outer side with a recess, $d$, which receives a nut, $d'$, that secures the cylinder to the shaft D, an annular space being left around said nut that receives the oil-drip from the bush C. The sides of this recess being inclined outward from its upper edge to its bottom, as shown in Fig. 1, the lubricating-oil is prevented from being thrown out of the recess by the centrifugal motion of the machine or cylinder. Wings or blades $f'$ are also formed on the outer side of the cylinder-head I, and arranged tangentially in a similar manner to those on the lower cylinder-head, except that the space for the passage of the mixture of lard and milk is on the outer part of the cylinder-head instead of near its center, as in the former case.

The revolving cylinder is provided on its outer surface with teeth or fine serrated projections H, which are formed by turning beveled grooves in one direction, and then cutting or milling these at a right angle, so as to bring the teeth to a sharp point, as shown in Fig. 7. The whole vertical surface of the cylinder is treated in this manner, so as to produce a large number of fine sharp projections or teeth, which are set close together, and the cylinder being revolved with great velocity effects a thorough disintegration of the lard contained in the mixture and facilitates its suspension in the milk.

On the lower end of the shaft D is a pulley, K, through which motion is communicated to the cylinder E by any suitable power.

The manner of using this machine in treating lard and milk for the manufacture of cheese is as follows: I take lard of the best quality and heat it in a suitable vessel until completely melted. The skimmed milk to be used therewith is also heated in a separate vessel to the same temperature as that attained by the melted lard, and the two ingredients, in the proportions of about one part lard and two parts milk, are then introduced simultaneously into the machine through the funnel $b'$ from their separate containing-vessels. Passing through the inlet $b$, the current of mixed milk and melted lard is driven or forced forward and upward by the pump-blades $f$, attached to the revolving cylinder E, into the space between said cylinder and the outer shell, B, where it is confined by the ribs B', and subjected, during the rapid revolution of the cylinder, to the action of the teeth H, which thoroughly comminute and disintegrate the particles of the melted lard, and thus facilitate its intimate mixture with the milk as they progress upward to the top of the machine. At this point the mixture is forced by the upper blades, $f'$, toward the outlet $c$, being also guided and directed to this outlet by the groove or channel $k$, which extends partly around the inner side of the upper head of the shell and deepens gradually as it approaches the outlet. When the mixture is discharged from the outlet it is received in a suitable vessel for removal to a cheese-vat, where it is mixed with skimmed milk having a temperature of about 90° Fahrenheit. The proportionate quantity of the mixture or compound to be added to the skimmed milk contained in the cheese-vat will depend on the quality of the cheese to be manufactured, from four to six parts of the mixture added to one hundred parts of skimmed milk making a cheese of average quality. After the mixture is added to the skimmed milk in the cheese-vat and thoroughly incorporated therewith by stirring a quantity of rennet is added, sufficient to coagulate it in about fifteen or twenty minutes. It is then cut in the usual manner and allowed to settle to the bottom of the vat, or until there is from one to two inches of whey over the curd. The whey is then skimmed to remove any oily particles that may arise to the surface, after which heat is gradually applied until the temperature is raised to about 98° or 100° Fahrenheit, the curd being stirred gently at the same time. After being allowed to stand until the curd shrinks and expels sufficient whey, the contents of the vat are again skimmed to remove any further oily particles that may have risen to the surface, and the whey being drawn off, the further manipulations are similar to those usually employed in cheese-making.

Having thus described my invention, what I claim as new, and desire to secure by Letters Patent, is—

1. In a machine for disintegrating and mixing lard with skimmed milk in the manufacture of cheese, the combination, with a revolving toothed cylinder provided with recessed heads having tangentially-arranged wings or blades, of an inclosing cylindrical shell provided with internal longitudinal ribs, and with heads having suitable inlet and outlet tubes formed therein, the inlet in the lower head being provided with a funnel attachment, whereby melted lard and skimmed milk may be simultaneously introduced from separate vessels into the vertical space between the inner toothed cylinder and its inclosing-shell, and there thoroughly disintegrated and intimately commingled during their passage upward to the outlet in the upper head of the shell, substantially as specified.

2. The combination, with the outer shell, B, provided with internal longitudinal ribs, B', lower head, G, having tube $b$ and projection $e'$, and upper head, L, having tube $c$, of the inner revolving cylinder, E, attached to the shaft D, and provided with external toothed surface H, lower head, F, having central recess, $e$, flange $h$, and wings $f$, and upper head, I, having recess $d$ and wings $f'$, substantially as specified.

In testimony whereof I affix my signature in presence of two witnesses.

WILLIAM COOLEY.

Witnesses:
F. H. SCHOTT,
A. R. BROWN.